US009467467B2

(12) United States Patent
Alamuri

(10) Patent No.: US 9,467,467 B2
(45) Date of Patent: Oct. 11, 2016

(54) DETECTION OF PRIVILEGE ESCALATION VULNERABILITIES USING BAG OF WORDS

(71) Applicant: CA, Inc., New York, NY (US)

(72) Inventor: Naga Venkata Sunil Alamuri, Hyderabad (IN)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 14/563,050

(22) Filed: Dec. 8, 2014

(65) Prior Publication Data
US 2016/0164904 A1  Jun. 9, 2016

(51) Int. Cl.
*G06F 11/00* (2006.01)
*H04L 29/06* (2006.01)

(52) U.S. Cl.
CPC ........... *H04L 63/1433* (2013.01); *H04L 63/08* (2013.01); *H04L 63/105* (2013.01)

(58) Field of Classification Search
CPC ............ G06F 21/577; H04L 63/1433; H04L 63/1416; H04L 63/20; H04L 63/1408
USPC ..................................................... 726/22–25
See application file for complete search history.

(56) References Cited

U.S. PATENT DOCUMENTS

| 8,850,583 B1 * | 9/2014 | Nelson | H04L 63/1433 380/44 |
| 2007/0192861 A1 * | 8/2007 | Varghese | H04L 63/145 726/23 |
| 2014/0201837 A1 * | 7/2014 | Varghese | H04L 63/1408 726/23 |
| 2015/0304346 A1 * | 10/2015 | Kim | H04L 63/1408 726/23 |

* cited by examiner

*Primary Examiner* — Baotran N To
(74) *Attorney, Agent, or Firm* — Stevens & Showalter LLP

(57) ABSTRACT

A method for detecting a privilege escalation vulnerability comprises selecting an address identifier of a web address with secure content. A first response to the address identifier being submitted as a first user having a first security clearance that is not sufficient to access the content is received. If not, then a second response to the address identifier submitted as a second user having a second security clearance that is sufficient to access the content is received. If a comparison of the first response to the second response satisfies a second vulnerability condition, then a privilege escalation vulnerability is reported. If not, then a first term frequency for the first response and a second term frequency for the second response are determined and compared. If the comparison of the first term frequency and the second term frequency satisfies a third vulnerability condition, then a privilege escalation is reported.

20 Claims, 6 Drawing Sheets

DETECTION OF PRIVILEGE ESCALATION VULNERABILITIES USING BAG OF WORDS

BACKGROUND

The present disclosure relates generally to managing secure content and more specifically to detecting privilege escalation vulnerabilities on a secure web application.

In many forms of software such as operating systems and applications, users are assigned "access rights" that control the software resources available to the user. Access rights are typically set up or otherwise defined by an application developer or system administrator. Privilege escalation is an act of an individual nefariously obtaining access rights different from those assigned to that individual.

Sometimes, privilege escalation is carried out by exploiting a bug, design flaw, or configuration oversight in the software to gain elevated access to resources that are normally unavailable to the individual. Privilege escalation can also occur by acquiring the access rights of another individual.

BRIEF SUMMARY

According to various aspects of the present disclosure, a method for detecting a privilege escalation vulnerability of secure content comprises selecting an address identifier of a web address with secure content that is accessible over a computer network. The method further comprises receiving a first response to the address identifier being submitted as a first user having a first security clearance that is not sufficient to access the content. If the first response does not satisfy a first vulnerability condition, then a second response to the address identifier submitted as a second user having a second security clearance that is sufficient to access the content is received. If a comparison of the first response to the second response satisfies a second vulnerability condition, then a privilege escalation vulnerability is reported. However, if the comparison of the first response to the second response does not satisfy the second vulnerability condition, then a first term frequency for the first response and a second term frequency for the second response are determined and compared. If the comparison of the first term frequency and the second term frequency satisfies a third vulnerability condition, then a privilege escalation is reported.

DETAILED DESCRIPTION

Aspects of the present disclosure disclose a method for detecting privilege escalation vulnerabilities associated with a web address. Privilege escalation is the act of an individual nefariously obtaining access rights that are different from those access rights assigned to that individual. For example, a certain web address with secure content may restrict access to only users with administrative privileges. However, a person without administrative privileges may try to circumvent the restriction to access the web address; such a person would be attempting a privilege escalation. The methods described herein may be used by an administrator or developer to detect if the web address includes vulnerabilities to such privilege escalation. If vulnerabilities are detected, then the developer or administrator may make changes to the security code of the web address to eliminate those vulnerabilities.

The methods described herein include at least three vulnerability conditions to detect the privilege escalation vulnerabilities using several different privilege escalation vulnerability conditions. The first vulnerability condition looks at the type of response that a user without privileged access would receive if that user were to access the secure web address. The second vulnerability condition compares the body of the response with a known response of a user that does have privileges to access the secure web address. The third vulnerability condition compares frequencies of terms within the body of the response with a frequency of those terms in the known response, as will be described in greater detail below. Using these three tests, false positives may be eliminated, and missed positives may be found over existing methods.

Figure 1:
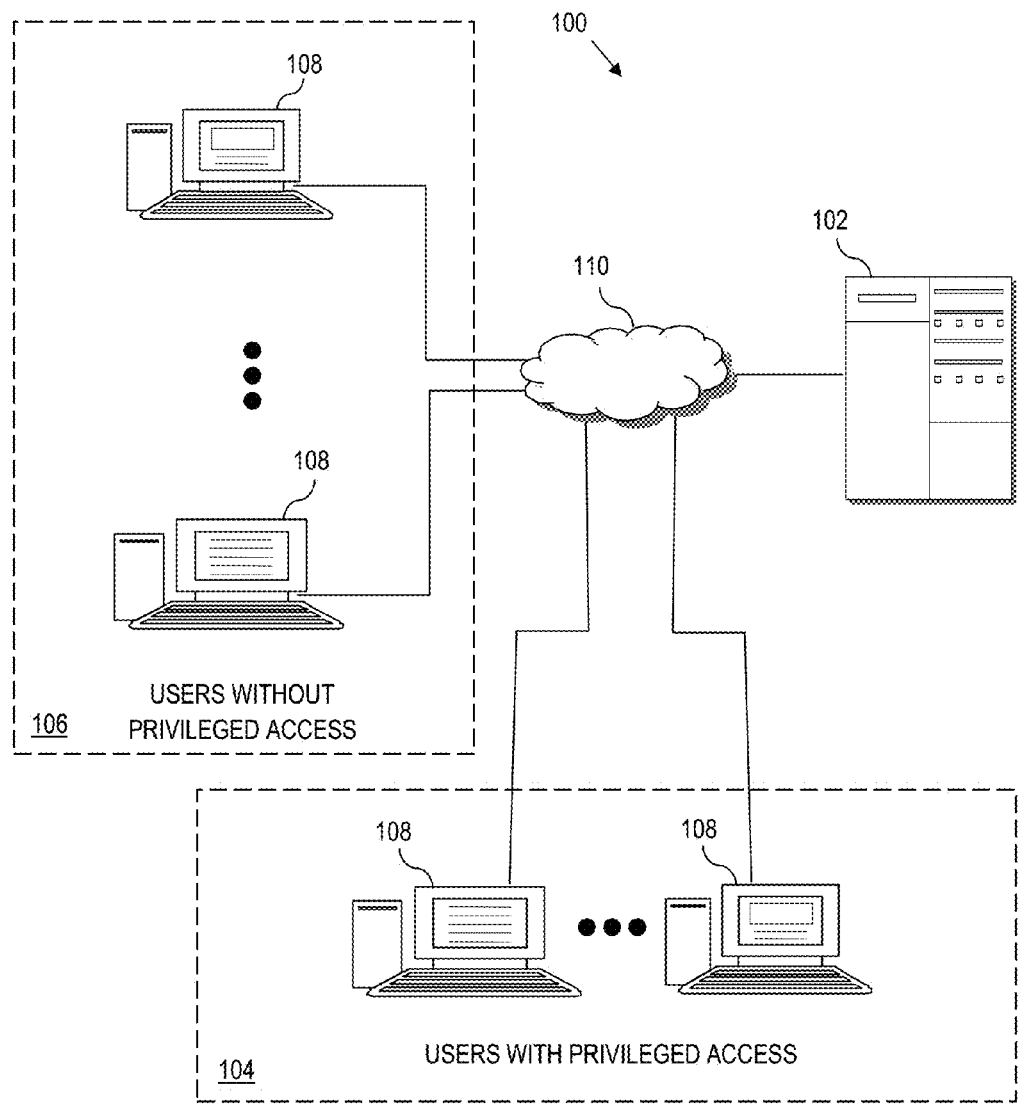
FIG. 1 is a block diagram illustrating a computer network, according to various aspects of the present disclosure.

Turning now to the figures and in particular to FIG. 1, a networking environment 100 is shown. A web address with secure content is located on a server 102 and is identified by an address identifier (e.g., a uniform resource locator (URL)). The content of the web address may be any content (e.g., a web page, a web application, database, combinations thereof, etc.) and may be accessed by users having a security clearance 104 that is sufficient to access the content. On the other hand, users without security clearance 106 sufficient to access the content are to be denied access to the content.

In order to attempt to access the secure content of the web address, a user 104, 106 submits the web address identifier, and a user 104 with a security clearance sufficient to access the content may also pass security credentials (e.g., username and password, public key certificate, X.509, biometrics, combinations thereof, etc.). Moreover, it is also possible that a user 106 without security clearance may pass incorrect security credentials (knowingly or unknowingly). As shown in FIG. 1, the users with privileged access 104 and the users without privileged access 106 are grouped using separate terminals 108 (e.g., personal computer, laptop, tablet, smartphone, etc.). However, that is merely presented for ease of understanding the principles disclosed herein. As such, it is possible for a user having privileged access to use the same terminal 108 as a user without privileged access.

The submissions are submitted to the server 102 (or a separate security server (not shown)) over a computer network (e.g., the Internet, an intranet, a local area network, etc.) 110, and the server receiving the submission sends a response indicating whether or not the user is granted access based on the user's submission.

For example, if a user with a security clearance sufficient to access the content of the web address submits the web address identifier and the security credentials, the server will respond that the user is granted access to the content (e.g., using an HTTP (hypertext transfer protocol) "200 OK" response). However, if a user without a security clearance sufficient to access the content of a web address submits the web address identifier, the server will respond that the user is denied access to the content (e.g., using an HTTP "401 Unauthorized" response). When the preceding examples occur, the security is functioning properly. However, if, for example, a user without a security clearance sufficient to access the content of a web address submits the web address identifier and the server responds by granting access to the secured content, then the secure content of the web address may be vulnerable to a privilege escalation.

Figure 2:
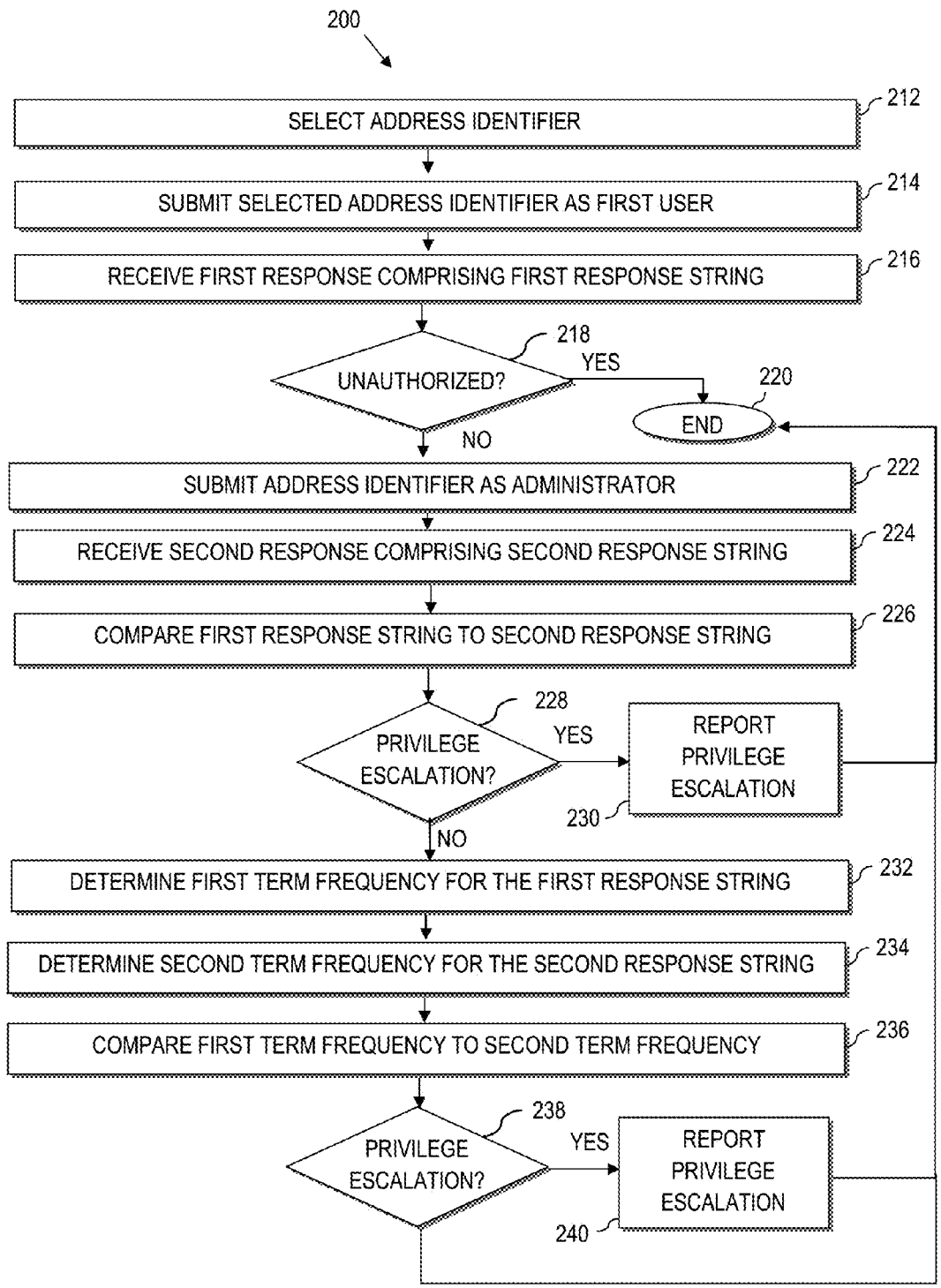
FIG. 2 is a flow chart illustrating a method of detecting privilege escalation vulnerabilities for secure content of a web address, according to various aspects of the present disclosure.

FIG. 2 illustrates a method 200 of detecting privilege escalation vulnerabilities of a web address. At 212 the address identifier of the web address with secure content that is accessible over a computer network is selected, and at 214, the selected web address identifier is submitted as a first user having a first security clearance that is not sufficient to access the content. For example, the selected web address identifier may be submitted with no credentials, invalid credentials, expired credentials, etc.

At 216, a first response comprising a first response string is received; further, the first response may include a header indicating a type of response. For example the first response may be an HTTP response (e.g., 401 Unauthorized, 200 OK, etc.). The expected response is that the first user is unauthorized and thus not granted access to the secure content on the web address. Thus, at 218, a comparison is made to determine if the response has satisfied a first vulnerability condition (e.g., whether the first response indicated that the user is unauthorized). If the response indicates that the user is unauthorized, then the method 200 ends at 220. For example, if the response is an HTTP 401 Unauthorized response, then the security for the selected web address is working properly, and the method ends. Further, the method may report that there is not a privilege escalation vulnerability for that web address using the submitted credentials (if any credentials were submitted).

However, if the response does not indicate that the user is unauthorized, then there may be a potential vulnerability. As such, at 222, the address identifier is submitted again, except this time as a second user having a second security clearance that is sufficient to access the content. For example, the selected web address identifier may be submitted with proper credentials for accessing the content.

At 224, a second response comprising a second response string is received. For example, the second response may include a second response string that indicates that the second user is granted access to the secured content. Then, at 226, the first response string is compared to the second response string. At 228, if the comparison of the first response string to the second response string satisfies a second vulnerability condition (e.g., if the first response string is identical to the second response string), then the first user would be granted to access the secure content, even with insufficient credentials. As such, the potential privilege escalation vulnerability has been verified, the privilege escalation vulnerability is reported at 230, and the method 200 ends at 220.

However, if the comparison of the first string to the second string does not satisfy a second vulnerability condition (e.g., if the first response string is not identical to the second response string in 228), then there still remains a possibility that the potential privilege escalation vulnerability from 218 is a valid privilege escalation vulnerability but may also not be a valid privilege escalation vulnerability. Therefore, at 232, a first term frequency is determined for the first response string. For example, a bag-of-words concept may be used to represent the first response string as a multi-set of its words, disregarding grammar and possibly word order, resulting in a term frequency. In other words, the first string may be organized by counting how many times (i.e., multiplicity) each unique word is in the first string. This organization may be used on all words in the first string or a subset of words in the first string.

Further, at 234, a second term frequency is determined for the second response string. This determination may be made similarly to the determination of the first word frequency, as described above. At 236, the first term frequency is compared to the second term frequency. This comparison may be done in any desirable way but is preferred to be done on a word-by-word basis. For example, the term frequency for each word in the second term frequency (or each word of a subset of words in the second term frequency) may be compared to a corresponding term frequency in the first term frequency and calculating any differences between corresponding term frequencies. Another example of the comparison is to use the following equation:

$$f(x) = \sum_{n=1}^{m} \frac{(A_n - N_n)}{A_n}$$

where m is the number of words used for comparison (e.g., all the words of the second term frequency, a subset of the words of the second term frequency, etc.), $A_n$ is the frequency for a select word from the second term frequency, and $N_n$ is the frequency for a select word from the first term frequency. Another example is to sum the differences in frequency for each word in the second term frequency (or subset thereof) and divide that result by the sum of the frequencies of those terms:

$$f(x) = \frac{\sum_{n=1}^{m} |A_n - N_n|}{\sum_{n=1}^{m} A_n}$$

where m is the number of words used for comparison (e.g., all the words of the second term frequency, a subset of the words of the second term frequency, etc.), $A_n$ is the frequency for a select word from the second term frequency, and $N_n$ is the frequency for a select word from the first term frequency.

At 238, if the comparison satisfies a third vulnerability condition (e.g., comparing the result of the comparison to a threshold), then there may be a privilege escalation vulnerability. For example, using either of the equations above, the closer the result of the comparison (f(x)) is to zero, the more likely there is a privilege escalation vulnerability. The threshold may be a constant or the threshold may be derived. For example the threshold may be based on the number of terms in the second term frequency. Moreover, there may be more than one threshold to classify a type of possible privilege escalation vulnerability. For example, there may be two thresholds and if the result of the comparison at 236 is below the first threshold, then the privilege escalation vulnerability may be classified as HIGH. If the result of the comparison at 236 is between the first threshold and the second threshold, then the privilege escalation vulnerability may be classified as MEDIUM. However, if the result of the comparison at 236 is greater than the second threshold, then the privilege escalation vulnerability may be classified as LOW. In any case, if a privilege escalation vulnerability is discovered, then a report of that vulnerability may be created at 240 and the method 200 ends; otherwise, the method may end without a report of a privilege escalation vulnerability.

Any of the reporting 230, 240 discussed above may be done in any desired manner. For example, the privilege escalation vulnerability may be stored in memory, stored in a file, may be displayed on a display, etc.

Figure 3A:
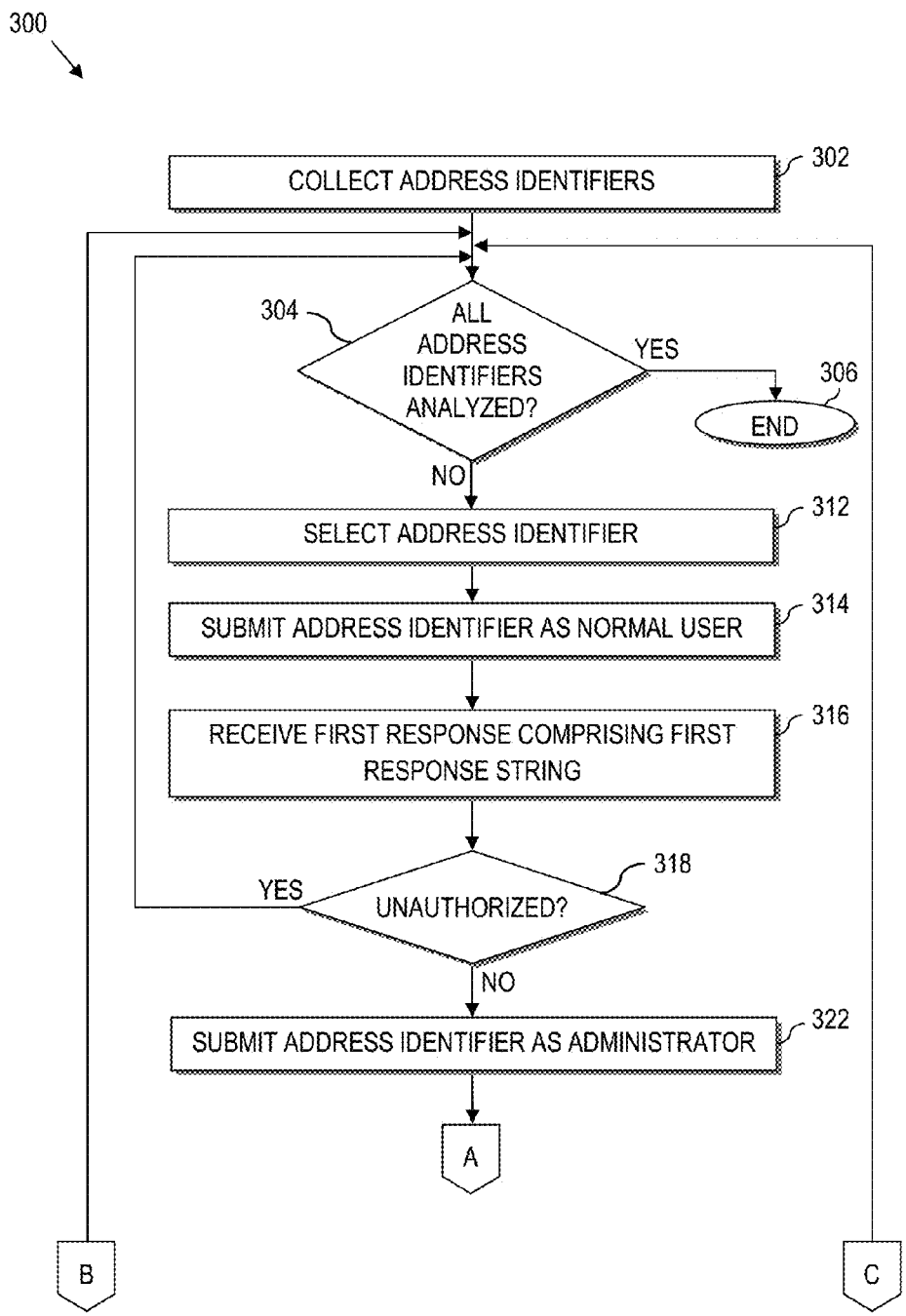
FIGS. 3A and 3B are a flow chart illustrating a method of detecting privilege escalation vulnerabilities for secure content of multiple web addresses, according to various aspects of the present disclosure.
Figure 3B:
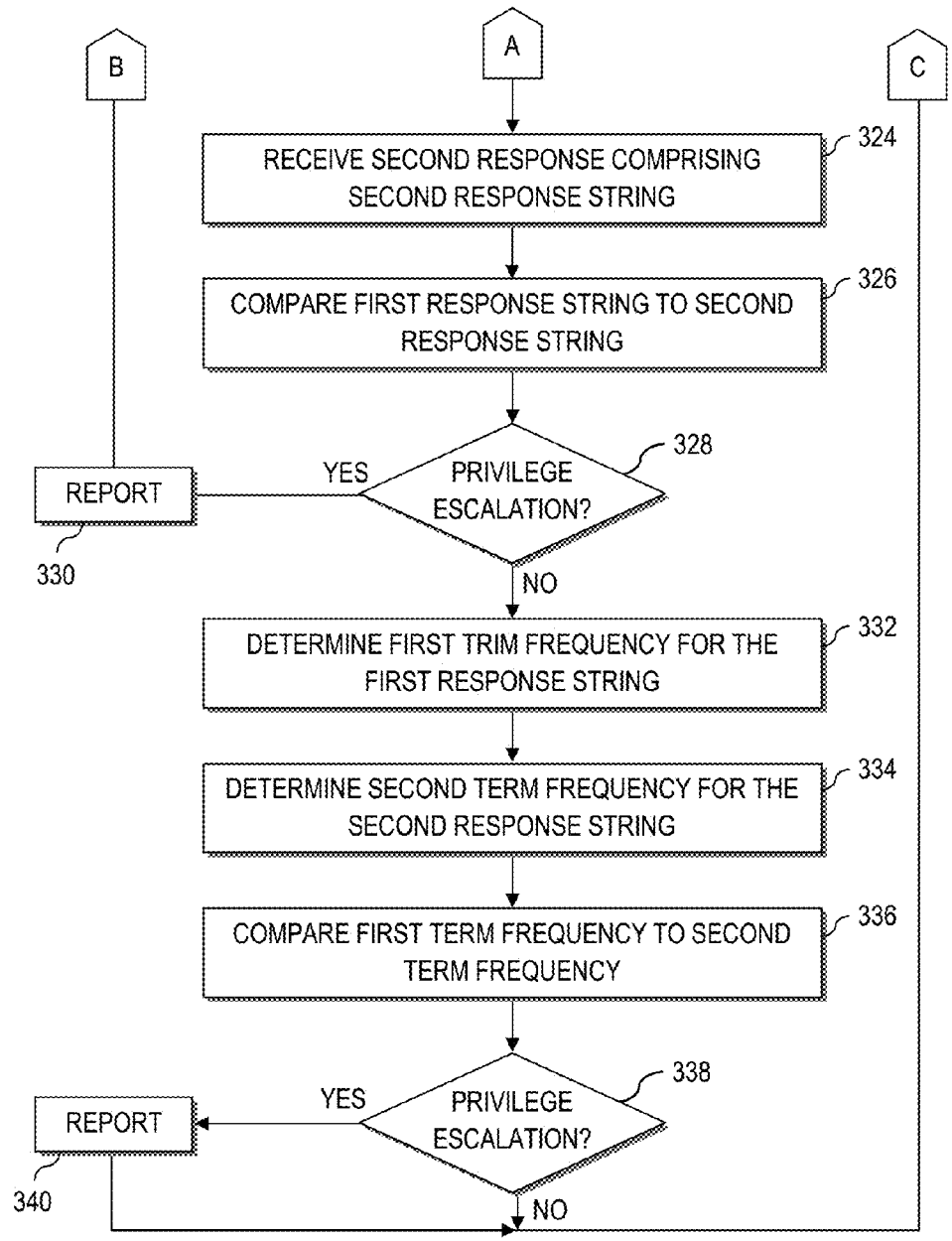

Turning now to FIGS. 3A-3B, a method 300 for detecting privilege escalations of multiple web addresses. At 302, address identifiers for web addresses with secure content are collected in a queue. At 304, a determination is made whether all of the address identifiers in the queue have been analyzed. If so, then the method 300 ends at 306. However, if there are still address identifiers in the queue that have not been analyzed, then an address identifier from the queue is selected at 312.

Similar to the method 200 of FIG. 2, at 314, the selected web address identifier is submitted as a first user having a first security clearance that is not sufficient to access the content. For example, the selected web address identifier may be submitted with no credentials, invalid credentials, expired credentials, etc. Then, at 316, a first response comprising a first response string is received; further, the first response may include a header indicating a type of response. For example, the first response may be an HTTP response (e.g., 401 Unauthorized, 200 OK, etc.). The expected response is that the first user is unauthorized and thus not granted access to the secure content on the web address.

At 318, a comparison is made to determine if the response has satisfied a first vulnerability condition (e.g., whether the first response indicated that the user is unauthorized). If the response does indicate that the user is unauthorized, then the method 300 proceeds back to 304 to determine if all of the address identifiers in the queue have been analyzed. For example, if the response is an HTTP 401 Unauthorized response, then the security for the selected web address is working properly, and the method loops back to 304. Further, the method may report that there is not a privilege escalation vulnerability for that web address using the submitted credentials (if any credentials were submitted).

However, if the response does not indicate that the user is unauthorized, then there may be a potential vulnerability. As such, at 322, the address identifier is submitted again, except this time as a second user having a second security clearance that is sufficient to access the content. For example, the selected web address identifier may be submitted with proper credentials for accessing the content.

At 324, a second response comprising a second response string is received. For example, the second response may include a second response string that indicates that the second user is granted access to the secured content. Then, at 326, the first response string is compared to the second response string. At 328, if the comparison of the first response string to the second response string satisfies a second vulnerability condition (e.g., if the first response string is identical to the second response string), then the first user would be granted to access the secure content, even with insufficient credentials. As such, the potential privilege escalation vulnerability has been verified, the privilege escalation vulnerability is reported at 330, and the method 300 loops back to 304.

However, if the comparison of the first string to the second string does not satisfy a second vulnerability condition (e.g., if the first response string is not identical to the second response string in 328), then there still remains a possibility that the potential privilege escalation vulnerability from 318 is a valid privilege escalation vulnerability but may also not be a valid privilege escalation vulnerability. Therefore, at 332, a first term frequency is determined for the first response string. For example, a bag-of-words concept may be used to represent the first response string as a multi-set of its words, disregarding grammar and possibly word order, resulting in a term frequency. In other words, the first string may be organized by counting how many times (i.e., multiplicity) each unique word is in the first string. This organization may be used on all words in the first string or a subset of words in the first string.

Further, at 334, a second term frequency is determined for the second response string. This determination may be made similarly to the determination of the first word frequency, as described above. At 336, the first term frequency is compared to the second term frequency. This comparison may be done in any desirable way but is preferred to be done on a word-by-word basis. For example, the term frequency for each word in the second term frequency (or each word of a subset of words in the second term frequency) may be compared to a corresponding term frequency in the first term frequency and calculating any differences between corresponding term frequencies. Another example of the comparison is to use the following equation:

$$f(x) = \sum_{n=1}^{m} \frac{(A_n - N_n)}{A_n}$$

where m is the number of words used for comparison (e.g., all the words of the second term frequency, a subset of the words of the second term frequency, etc.), $A_n$ is the frequency for a select word from the second term frequency, and $N_n$ is the frequency for a select word from the first term frequency. Another example is to sum the differences in frequency for each word in the second term frequency (or subset thereof) and divide that result by the sum of the frequencies of those terms:

$$f(x) = \frac{\sum_{n=1}^{m} |A_n - N_n|}{\sum_{n=1}^{m} A_n}$$

where m is the number of words used for comparison (e.g., all the words of the second term frequency, a subset of the words of the second term frequency, etc.), $A_n$ is the frequency for a select word from the second term frequency, and $N_n$ is the frequency for a select word from the first term frequency.

At 338, if the comparison satisfies a third vulnerability condition (e.g., comparing the result of the comparison to a threshold), then there may be a privilege escalation vulnerability. For example, using either of the equations above, the closer the result of the comparison (f(x)) is to zero, the more likely there is a privilege escalation vulnerability. The threshold may be a constant or the threshold may be derived. For example the threshold may be based on the number of terms in the second term frequency. Moreover, there may be more than one threshold to classify a type of possible privilege escalation vulnerability. For example, there may be two thresholds and if the result of the comparison at 336 is below the first threshold, then the privilege escalation vulnerability may be classified as HIGH. If the result of the comparison at 336 is between the first threshold and the second threshold, then the privilege escalation vulnerability may be classified as MEDIUM. However, if the result of the comparison at 336 is greater than the second threshold, then the privilege escalation vulnerability may be classified as LOW. In any case, if a privilege escalation vulnerability is discovered, then a report of that vulnerability may be created at 340 and the method 300 loops back to 304; otherwise, the method 300 loops back to 304 without a report of a privilege escalation vulnerability.

Any of the reporting 330, 340 discussed above may be done in any desired manner. For example, the privilege escalation vulnerability may be stored in memory, stored in a file, may be displayed on a display, etc.

The methods 200, 300 described above help identify privilege escalation vulnerabilities for content of web addresses. Specifically, the three vulnerability conditions used in conjunction reduce false positives of vulnerabilities and reduce false negatives. For example, if a user who does not have valid credentials tries to access secure content of a website, then a security server may respond back with a 200 OK response with a string that indicates that the user is unauthorized. If only the first vulnerability condition were used, then such a response would be flagged as a vulnerability. However, because the string indicates that the user is unauthorized, then the second and third vulnerability conditions may determine that there is not a vulnerability in reality.

Figure 4:
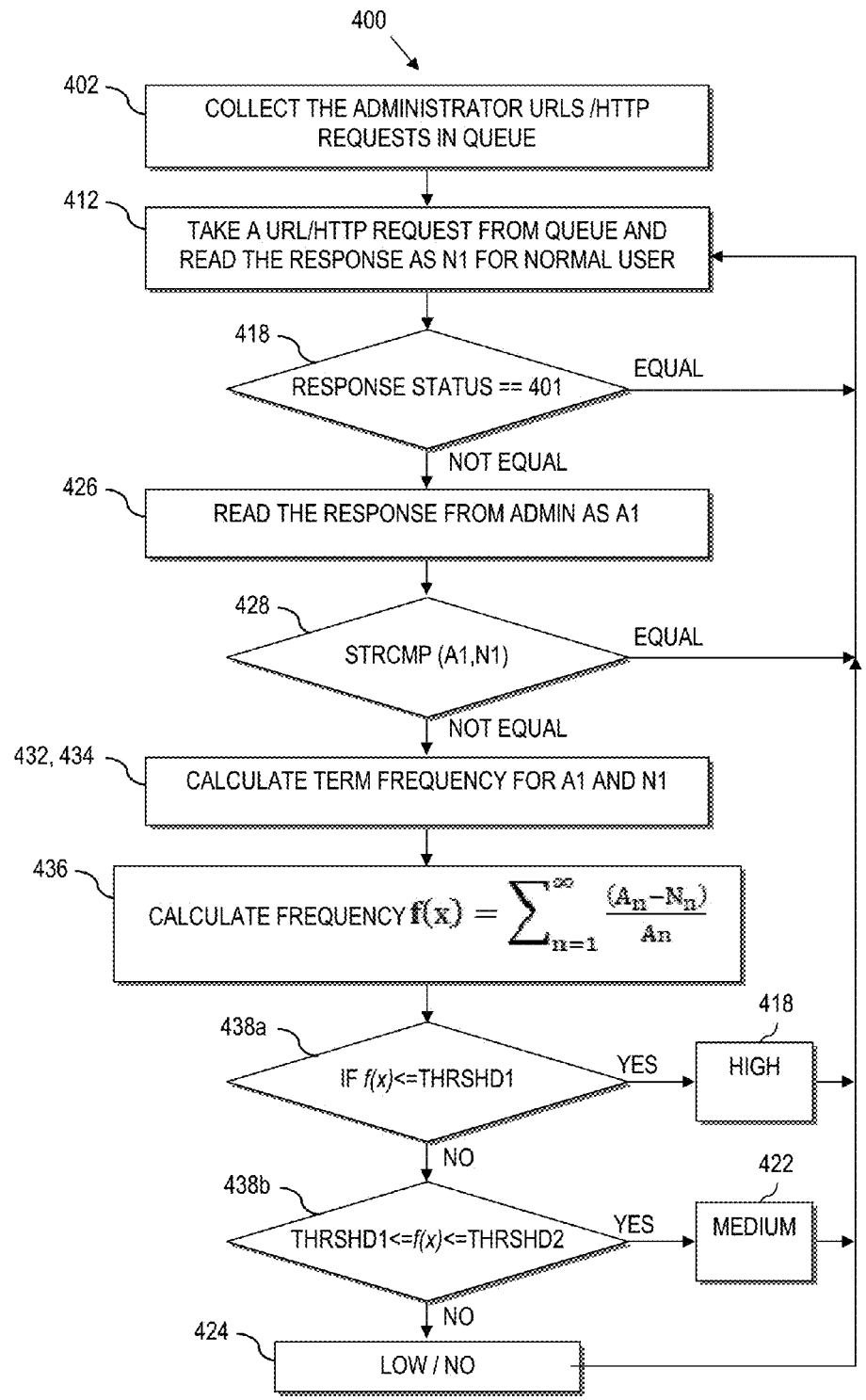
FIG. 4 is a flow chart illustrating a method of detecting privilege escalation vulnerabilities including a double threshold for a bag-of-words comparison, according to various aspects of the present disclosure.

An non-limiting example of the methods 200, 300 is shown in a simplified form in FIG. 4. At 402, five uniform resource locators (URLs) are collected in a queue for analysis. These URLs are address identifiers of web addresses that have content with restricted access. For example, the content of the web addresses may include content that is only meant to be accessed by users with administrative privileges, while other users may not access the content. The collected address identifiers may point to a web address generally or may point to specific content of a web address directly.

At 412, the first URL is selected from the queue. The selected URL (i.e., address identifier) is sent to a security server for the web address identified by the web identifier as a user with credentials as a non-administrator, and an HTTP 401 Unauthorized response is received from the server. At 418, it is determined that the response received from the server is indeed a 401 Unauthorized response, which is a proper response for the credentials sent. As such, the security for the URL is working properly; an indication of which may be sent to a report file.

The method loops back to 412 to select the second URL in the queue. Again, the selected URL is sent to a security server for the web address identified by the web identifier as a user with credentials as a non-administrator. However, this time an HTTP 200 OK response is received from the server, and a body of this response incorrectly indicates that the user is authorized to access the content. As such, at 418, the response is determined to not be a 401 Unauthorized response. Therefore, the selected URL is sent to the security server as a user with credentials as an administrator (i.e., as a user with privileges to access the content). A second response is received from the server that indicates a 200 OK response and includes a body (i.e., string) that correctly identifies that the user is authorized. At 428, the body of the first response is compared to the body of the second response and is found to be identical. This comparison verifies a privilege escalation vulnerability at the second URL, which is reported.

The method loops back to 412 to select the third URL from the queue. Again, the selected URL is sent to a security server for the web address identified by the web identifier as a user with credentials as a non-administrator. An HTTP 200 OK response is received from the server, and a body of this response incorrectly indicates that the user is authorized to access the content and includes a time stamp. As such, at 418, the response is determined to not be a 401 Unauthorized response. Therefore, the selected URL is sent to the security server as a user with credentials as an administrator. A second response is received from the server that indicates a 200 OK response and includes a body that correctly identifies that the user is authorized and includes a timestamp. At 428, the body of the first response is compared to the body of the second response and is found not to be identical, because the timestamps are different between the two responses. Then, at 432, each of the terms in the body of the first response are counted to create a term frequency for the first response, and each of the terms in the body of the second response are counted to create a term frequency for the second response. Using the equation:

$$f(x) = \sum_{n=1}^{m} \frac{(A_n - N_n)}{A_n}$$

a term frequency comparison is generated at 436. That term frequency comparison result is then compared to a first threshold at 438*a* and found to be less than the first threshold, because the only difference between the bodies of the two responses is the timestamp. As such, there is a HIGH probability of a privilege escalation vulnerability, which is reported.

The method loops back to 412 to select the fourth URL from the queue. Again, the selected URL is sent to a security server for the web address identified by the web identifier as a user with credentials as a non-administrator. However, this time an HTTP 200 OK response is received from the server, but a body of this response indicates that the user is not authorized to access the content. As such, at 418, the response is determined to not be a 401 Unauthorized response. Therefore, the selected URL is sent to the security server as a user with credentials as an administrator. A second response is received from the server that indicates a 200 OK response and includes a body that correctly identifies that the user is authorized. At 428, the body of the first response is compared to the body of the second response and is found not to be identical. At 432, each of the terms in the body of the first response are counted to create a term frequency for the first response, and each of the terms in the body of the second response are counted to create a term frequency for the second response. Using the equation:

$$f(x) = \sum_{n=1}^{m} \frac{(A_n - N_n)}{A_n}$$

a term frequency comparison is generated at 436. That term frequency comparison result is then compared to a first threshold at 438a and found to be more than the first threshold, so the term frequency comparison result is then compared to a second threshold at 438b and found to be between the first and second thresholds (i.e., some similarities in the bodies, but some differences, too). As such, there is a MEDIUM probability of a privilege escalation vulnerability, which is reported.

The method loops back to 412 to select the fourth URL from the queue. Again, the selected URL is sent to a security server for the web address identified by the web identifier as a user with credentials as a non-administrator. However, this time an HTTP 200 OK response is received from the server, but a body of this response indicates that the user is not authorized to access the content. As such, at 418, the response is determined to not be a 401 Unauthorized response. Therefore, the selected URL is sent to the security server as a user with credentials as an administrator. A second response is received from the server that indicates a 200 OK response and includes a body that correctly identifies that the user is authorized. At 428, the body of the first response is compared to the body of the second response and is found not to be identical. At 432, each of the terms in the body of the first response are counted to create a term frequency for the first response, and each of the terms in the body of the second response are counted to create a term frequency for the second response. Using the equation:

$$f(x) = \sum_{n=1}^{m} \frac{(A_n - N_n)}{A_n}$$

a term frequency comparison is generated at 436. That term frequency comparison result is then compared to a first threshold at 438a and found to be more than the first threshold, so the term frequency comparison result is then compared to a second threshold at 438b and found to be higher than the second threshold (i.e., very few similarities between the bodies of the first and second responses). As such, there is a LOW or NO probability of a privilege escalation vulnerability, which may be reported. There are no more URLs in the queue, so the example method 400 ends. A final report may look like:

URL 1: No vulnerability detected
URL 2: Vulnerability detected
URL 3: High likelihood of vulnerability detected
URL 4: Medium likelihood of vulnerability detected
URL 5: Low likelihood of vulnerability detected At any time during or after the analysis, an expert (e.g., administrator, developer, etc.) may then use the report to determine which web addresses need to be made more secure.

Figure 5:
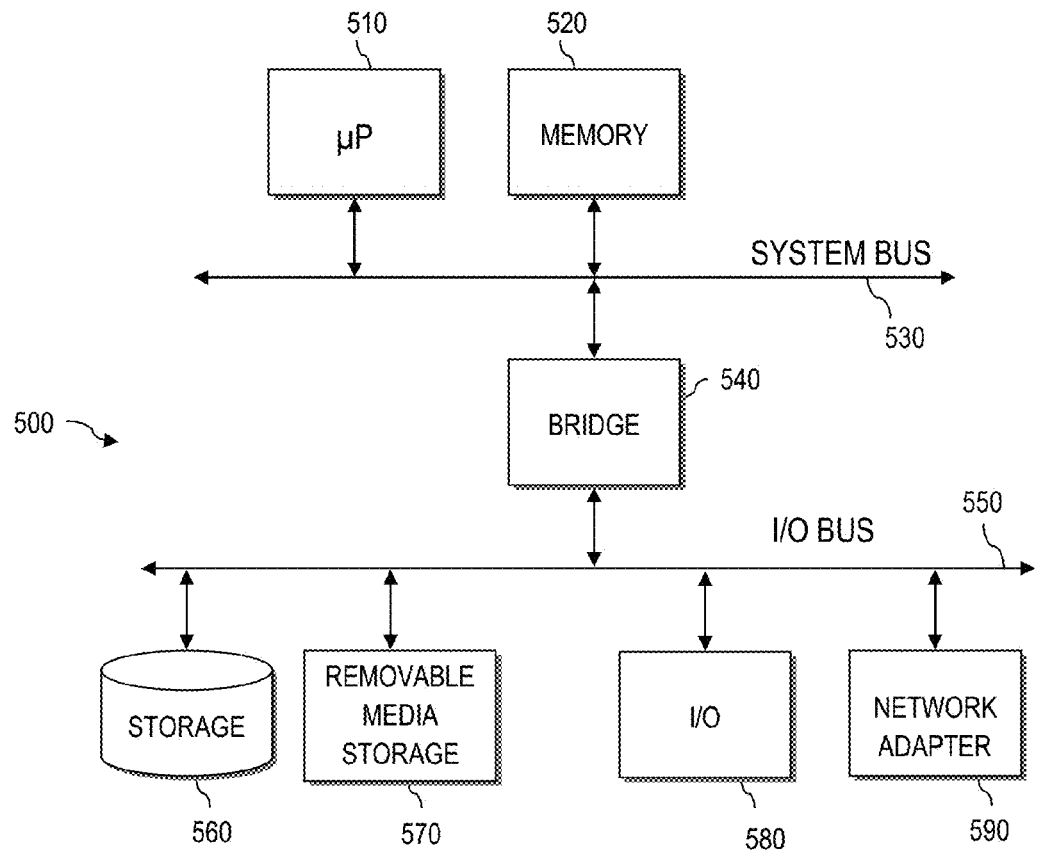
FIG. 5 is a schematic of a computer system comprising computer readable program code for executing any aspects described herein with regard to FIGS. 1-4, according to various aspects of the present disclosure.

Referring to FIG. 5, a schematic block diagram illustrates an exemplary computer system 500 for implementing the various methods described herein (e.g., by interacting with a user). The exemplary computer system 500 includes one or more microprocessors (μP) 510 and corresponding memory 520 (e.g., random access memory and/or read only memory) that are connected to a system bus 530. Information can be passed between the system bus 530 and another bus 540 by a suitable bridge 550. The bus 540 is used to interface peripherals with the one or more microprocessors (g) 510, such as storage 560 (e.g., hard disk drives); removable media storage devices 570 (e.g., flash drives, DVD-ROM drives, CD-ROM drives, floppy drives, etc.); I/O devices 580 (e.g., mouse, keyboard, monitor, printer, scanner, etc.); and a network adapter 590. The above list of peripherals is presented by way of illustration and is not intended to be limiting. Other peripheral devices may be suitably integrated into the computer system 500.

The microprocessor(s) 510 control operation of the exemplary computer system 500. Moreover, one or more of the microprocessor(s) 510 execute computer readable code that instructs the microprocessor(s) 510 to implement the methods herein. The computer readable code may be stored for instance, in the memory 520, storage 560, removable media storage device 570 or other suitable tangible storage medium accessible by the microprocessor(s) 510. The memory 520 can also function as a working memory to store information (e.g., data, an operating system, etc.).

Thus, the exemplary computer system 500 or components thereof can implement the methods described herein. The exemplary computer system 500 can also provide computer-readable storage device(s) that store code that can be executed to implement the methods as set out in greater detail herein. Other computer configurations may also implement the methods and computer-readable storage devices as set out in greater detail herein.

Computer program code for carrying out operations for various aspects of the present disclosure set out herein, may be written in any combination of one or more programming languages. The program code may execute entirely on the computer system 500. Alternatively, the program code may execute partly on the computer system 500 and partly on a remote computer. Here, the remote computer may be connected to the computer system 500 through any type of network connection (e.g., using the network adapter 590 of the computer system 500). Still further, the program code may be implemented on a remote computer.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
    selecting, by a processor of a computer system, an address identifier of a web address with content that is accessible over a computer network;
    receiving, by the processor, a first response to the address identifier being submitted as a first user having a first security clearance that is not sufficient to access the content, the first response comprising a first response string; and
    performing by the processor, based upon determining that the first response does not satisfy a first vulnerability condition:

receiving, by the processor, a second response to the address identifier submitted as a second user having a second security clearance that is sufficient to access the content, the second response comprising a second response string;

reporting, by the processor, a first privilege escalation vulnerability where a comparison of the first response string to the second response string satisfies a second vulnerability condition; and performing, by the processor, based upon determining that the comparison of the first response string to the second response string does not satisfy the second vulnerability condition processes comprising:

determining a first term frequency for the first response string;

determining a second term frequency for the second response string;

comparing the first term frequency and the second term frequency; and reporting a second privilege escalation vulnerability where the comparison of the first term frequency and the second term frequency satisfies a third vulnerability condition.

2. The method of claim 1 further comprising:
collecting web address identifiers into a queue; and
iteratively performing the method for each web address identifier in the queue.

3. The method of claim 1, wherein determining that the first response string does not satisfy a first vulnerability condition further includes determining that the first response does not indicate that the user is unauthorized to access the web address.

4. The method of claim 1 further comprising:
determining that the first response does satisfy the first vulnerability condition by determining that the first response indicates that the user is unauthorized, by determining that authorization credentials associated with the first user were refused by the submitted address identifier; and
ending the processing of the selected address identifier if the user is unauthorized.

5. The method of claim 4, wherein:
determining that authorization credentials associated with the first user were refused by the submitted address identifier, comprises:
receiving a hypertext transfer protocol (HTTP) 401 unauthorized message.

6. The method of claim 1, wherein:
determining that the first response does not satisfy a first vulnerability condition further comprises determining that authorization credentials associated with the first user were not refused by the submitted address identifier.

7. The method of claim 6, wherein:
determining that authorization credentials associated with the first user were not refused by the submitted address identifier comprises receiving any message except a hypertext transfer protocol (HTTP) 401 unauthorized message.

8. The method of claim 6, wherein:
determining that authorization credentials associated with the first user were not refused by the submitted address identifier comprises receiving a hypertext transfer protocol (HTTP) 200 OK message.

9. The method of claim 1, wherein:
reporting a first privilege escalation vulnerability where a comparison of the first response string to the second response string satisfies a second vulnerability condition, comprises:
reporting the first privilege escalation vulnerability upon determining that the first response string is the same as the second response string.

10. The method of claim 9 further comprising:
ending the processing of the selected address identifier upon determining that the first response string is the same as the second response string.

11. The method of claim 1, wherein:
determining a first term frequency for the first response string comprises:
applying a bag-of-words concept to find the term frequency for the first response string by representing the first response string as a multi-set of words of the first response string, by disregarding grammar and word order, and by keeping multiplicity of the words in the first response string.

12. The method of claim 11, wherein:
determining a second term frequency for the second response string comprises:
applying a bag-of-words concept to find the term frequency for the second response string by representing the second response string as a multiset of words of the second response string, by disregarding grammar and word order, and by keeping multiplicity of the words in the second response string.

13. The method of claim 12, wherein:
comparing the first term frequency and the second term frequency comprises:
calculating the term frequency differences between the term frequency for the first response string and the term frequency for the second response string.

14. The method of claim 12, wherein:
comparing the first term frequency and the second term frequency comprises:
computing a comparison frequency f(x) as:

$$f(x) = \sum_{n=1}^{m} \frac{(A_n - N_n)}{A_n},$$

where $A_n$ and $N_n$ contain same word: and
wherein:
$A_n$ is a first frequency, which corresponds to a select word from the second term frequency;
$N_n$ is a second frequency, which corresponds to a chosen word from the first term frequency; and
m is a number of words used for comparison.

15. The method of claim 14, wherein:
reporting a second privilege escalation vulnerability where the comparison satisfies a third vulnerability condition comprises:
reporting the second privilege escalation vulnerability upon a determination that the computed comparison frequency is between zero and a predetermined minimum value.

16. The method of claim 14 further comprising:
classifying the comparison frequency as a designated one of at least a high, medium, or low value based upon the computed value of the comparison frequency;

wherein:
reporting a second privilege escalation vulnerability where the comparison satisfies a third vulnerability condition comprises:
reporting the second privilege escalation vulnerability based upon the classification.

17. The method of claim 1 further comprising:
submitting the selected address identifier as the first user; and
submitting, based upon determining that the first response did not satisfy the first vulnerability condition, the selected address identifier as the second user having a second security clearance that is sufficient to access the content.

18. A method comprising:
collecting, by a processor of a computer system, address identifiers into a queue; and
performing, by the processor, until all of the collected address identifiers in the queue have been analyzed, processes comprising:
selecting a collected address identifier;
submitting, by the processor, the selected address identifier as a first user having a first security clearance that is not sufficient to access the content;
receiving, by the processor, a first response to the address identifier submitted as the first user, the first response comprising a first response string;
ending, by the processor, the processing of the selected address identifier as no privilege escalation vulnerability for that selected address identifier if the first response indicates that the first user is unauthorized; and
performing, by the processor, based upon determining that the first response did not indicate that the user is unauthorized, processes comprising:
submitting the selected address identifier as an second user having a second security clearance that is sufficient to access the content;
receiving a second response to the address identifier submitted as the second user, the second response comprising a second response string;
reporting a first privilege escalation vulnerability where the first response string is the same as the second response string and end the processing of the selected uniform resource locator; and
performing, based upon determining that the first response string is different from the second response string;
determining a first term frequency for the first response string by applying a bag-of-words concept to find the term frequency for the first response string by representing the first response string as a multiset of words of the first response string, by disregarding grammar and word order, and by keeping multiplicity of the words in the first response string;
determining a second term frequency for the second response string by applying a bag-of-words concept to find the term frequency for the second response string by representing the second response string as a multiset of words of the second response string, by disregarding grammar and word order, and by keeping multiplicity of the words in the second response string;
comparing the first term frequency and the second term frequency based upon term frequencies and term weighting; and reporting a second privilege escalation vulnerability where the comparison of the first term frequency and the second term frequency satisfies a vulnerability condition.

19. A method comprising:
collecting, by a processor of a computer system, uniform resource locators into a queue;
performing, by the processor, until all of the collected uniform resource locators in the queue have been analyzed, processes comprising:
selecting a collected uniform resource locator;
submitting, by the processor, the selected uniform resource locator as a first user having a first security clearance that is not sufficient to access the content;
receiving, by the processor, a first response to the uniform resource locator submitted as the first user, the first response comprising a first response string;
ending, by the processor, the processing of the selected uniform resource locator as no privilege escalation vulnerability for that selected uniform resource locator if the first response indicates that the first user is unauthorized; and
performing, by the processor, based upon determining that the first response did not indicate that the user is unauthorized by:
submitting the selected uniform resource locator as an second user having a second security clearance that is sufficient to access the content;
receiving a second response to the uniform resource locator submitted as the second user, the second response comprising a second response string;
reporting a privilege escalation vulnerability where the first response string is the same as the second response string and end the processing of the selected uniform resource locator; and
performing, based upon determining that the first response string is different from the second response string, processes comprising;
determining a first term frequency for the first response string by applying a bag-of-words concept to find the term frequency for the first response string by representing the first response string as a multiset of words of the first response string, by disregarding grammar and word order, and by keeping multiplicity of the words in the first response string;
determining a second term frequency for the second response string by applying a bag-of-words concept to find the term frequency for the second response string by representing the second response string as a multiset of words of the second response string, by disregarding grammar and word order, and by keeping multiplicity of the words in the second response string;
comparing the first term frequency and the second term frequency by computing a comparison frequency f(x) as:

$$f(x) = \sum_{n=1}^{m} \frac{(A_n - N_n)}{A_n},$$

where:
$A_n$ and $N_n$ contain same word;
$A_n$ is a first frequency, which corresponds to a select word from the second term frequency;

$N_n$ is a second frequency, which corresponds to a chosen word from the first term frequency; and m is a number of words used for comparison; and reporting the privilege escalation vulnerability upon a determination that the computed comparison frequency is between zero and a predetermined minimum value.

20. The method of claim 19 further comprising:

classifying the comparison frequency f(x) as a designated one of at least a high, medium, or low value based upon the computed value of the comparison frequency;

wherein:

reporting a privilege escalation vulnerability comprises reporting the privilege escalation vulnerability based upon the classification.

\* \* \* \* \*